United States Patent [19]

Shiraishi et al.

[11] Patent Number: 5,155,686
[45] Date of Patent: Oct. 13, 1992

[54] PHYSICAL QUANTITY CONTROL DEVICE USABLE IN VEHICLE MOTION CONTROL

[75] Inventors: Shuji Shiraishi; Osamu Yamamoto; Keiyu Kin; Yoshimitsu Akuta, all of Saitama, Japan

[73] Assignee: Honda Giken Hogyo Kabushiki Kaisha, Tokyo, Japan

[21] Appl. No.: 530,361

[22] Filed: May 30, 1990

[30] Foreign Application Priority Data

May 31, 1989 [JP] Japan .................. 1-138370
May 31, 1989 [JP] Japan .................. 1-138371

[51] Int. Cl.$^5$ .................. G06F 15/20
[52] U.S. Cl. .................. 364/426.03; 364/426.01; 303/95; 180/197
[58] Field of Search .................. 364/426.02, 426.03, 364/431.05; 123/352, 354, 349; 303/95; 180/197

[56] References Cited

U.S. PATENT DOCUMENTS

| | | | |
|---|---|---|---|
| 4,709,335 | 11/1987 | Okamoto | 364/431.05 |
| 4,860,210 | 8/1989 | McCombie | 364/426.04 |
| 4,886,123 | 12/1989 | Arnold et al. | 172/7 |
| 4,924,396 | 5/1990 | Fujioka et al. | 364/426.03 |

*Primary Examiner*—Thomas G. Black
*Attorney, Agent, or Firm*—Armstrong, Nikaido, Marmelstein, Kubovcik & Murray

[57] ABSTRACT

A physical quantity control device includes first and second control elements having different sensitivities from one another, the first and second control elements providing outputs to change at least one physical quantity in response to first and second operational quantities individually input to the first and second control elements. First and second computing circuits are provided for computing the first and second operational quantities in response to a deviation between a predetermined target value and the physical quantity, wherein the physical quantity is feedback controlled to converge with the predetermined target value. Further, first and second filters for passing frequencies individually corresponding to the sensitivies of the first and second control elements, respectively, the first filter being provided in a feedback loop including the first control elements and the first computing circuit, and the second filter being provided in a second feedback loop including the second control element and the second computing circuit. Further, the output of the first and second control elements is preferably input to an operation means to generate the physical quantity, wherein the physical quantity controlled is a vehicle motion.

12 Claims, 2 Drawing Sheets

PHYSICAL QUANTITY CONTROL DEVICE USABLE IN VEHICLE MOTION CONTROL

BACKGROUND OF THE INVENTION

1. Field of the Invention

The present invention relates to a physical quantity control device including first and second control means having different sensitivities and capable of changing at least one physical quantity according to first and second operational quantities to be individually input to said first and second control means, respectively, and first and second computing means for computing said first and second operational quantities according to a deviation between a predetermined target value and said physical quantity, wherein said physical quantity is feedback-controlled to be converged to said predetermined target value.

Further, the present invention also relates to a vehicle motion control device including operating means for outputting a physical quantity which effects a vehicle motion, first and second control means having different sensitivities and capable of changing said physical quantity output from said operating means according to first and second operational quantities to be individually input to said first and second control means, respectively, and first and second computing means for computing said first and second operational quantities according to a deviation between a predetermined target value and said output physical quantity, wherein said output physical quantity is feedback-controlled to converge to said predetermined target value.

2. Related Art

Conventionally, a known traction control device for a vehicle is so designed as to control a driving wheel speed as a physical quantity by controlling a throttle valve opening of an engine by a first control means and controlling a brake pressure by a second control means. Further, a known engine speed control device is so designed as to control a rotational speed of an engine mounted in a vehicle by controlling a throttle valve opening by a first control means, controlling a fuel supply quantity by a second control means, and controlling an ignition timing of the engine by a third control means.

However, in a case where the physical quantity is feedback-controlled to become the same target value by the two control means in two feedback control systems, interference is generated between both feedback control systems which will cause mutual disturbance because of a difference in response frequency (i.e., a difference in delay of control) between both feedback control systems.

To cope with this problem, it has been conventionally proposed that the feedback control is prevented from being conducted simultaneously in both feedback control systems by setting different target values or providing a time lag for the controls by both the feedback control systems (Japanese Patent Laid-open Publication Nos. 61-85249 and 58-16948, for example).

However, in the case of setting different target values as mentioned above, the two feedback control systems have the different target values for the same physical quantity, a weak control system of both the control systems is dragged to a strong control system by a difference between the target values. On the other hand, in the case of providing a time lag for the controls by both feedback control systems, the control is carried out by only one of the feedback control systems in a certain control time, with the result that a sufficient control performance cannot be exhibited in both the feedback control systems. Additionally, complex processing must be carried out when switching the control between both feedback control systems.

The present invention has been achieved in view of the foregoing, and it is an object of the present invention to provide a physical quantity control device which avoids the control interference between both control means and sufficiently exhibits the control performance of both the control systems. It is a further object of the present invention to provide a vehicle motion control device similar to said physical quantity control device.

SUMMARY OF THE INVENTION

According to a first feature of the present invention, there are provided first and second filter means for allowing the passing of frequencies individually corresponding to said sensitivities of said first and second control means, respectively, said first filter means being provided in a first feedback loop including said first control means and said first computing means, and said second filter means being provided in a second feedback loop including said second control means and said second computing means. Therefore, mutual interference between both the control means can be avoided, and a sufficient control performance can be exhibited in both the control means.

According to a second feature of the present invention, said first filter means comprises a first physical quantity filter provided in said first feedback loop including said first control means and said first computing means for filtering said output physical quantity from said operating means at said frequency corresponding to said sensitivity of said first control means, and said second filter means comprises a second physical quantity filter provided in said second feedback loop including said second control means and said second computing means for filtering said output physical quantity at said frequency corresponding to said sensitivity of said second control means. Therefore, the controls in both the feedback loops are conducted according to the physical quantities corresponding to the sensitivities of both the control means, respectively, thereby exhibiting a sufficient control performance.

According to a third feature of the present invention, said first filter means comprises a first target value filter provided in said first feedback loop including s id first control means and said first computing means for filtering said target value at said frequency corresponding to said sensitivity of said first control means and a first physical quantity filter provided in said first feedback loop including said first control means and said first computing means for filtering said output physical quantity from said operating means at said frequency corresponding to said sensitivity of said first control means. Said second filter means comprises a second physical quantity filter provided in said second feedback loop including said second control means and said second computing means for filtering said output physical quantity at said frequency corresponding to said sensitivity of said second control means and a second target value filter, provided in said second feedback loop including said second control means and said second computing means for filtering said target value at said frequency corresponding to said sensitivity of said second control means. Therefore, the first and second operational quantities are defined by the first and second computing means according to the deviation between the first physical quantity and the first target value each corresponding to the sensitivity of the first control means and according to the deviation between the second physical quantity and the second target value each corresponding to the sensitivity of the second control means. Accordingly, even when the target value is variable in the control system, the controls by the first and second control means do not mutually interfere with each other, and a sufficient control performance can be exhibited in both the control means.

According to a fourth feature of the present invention, said first filter means comprises a first deviation filter provided in said first feedback loop including said first control means and said first computing means for filtering said deviation between said target value and said output physical quantity at said frequency corresponding to said sensitivity of said first control means, and said second filter means comprises a second deviation filter provided in said second feedback loop including said second control means and said second computing means for filtering said deviation between said target value and said output physical quantity at said frequency corresponding to said sensitivity of said second control means. Therefore, the first and second operational quantities are defined by the first and second computing means according to the first and second deviations corresponding to the sensitivities of the first and second control means, respectively. Accordingly, even when the target value is variable in the control system, the controls by the first and second control means do not mutually interfere with each other, and a sufficient control performance can be exhibited in both the control means.

According to a fifth feature of the present invention, said operating means comprises a driving wheel, and said first control means comprises a throttle valve opening control means, and said second control means comprises a fuel quantity change control means for controlling a fuel supply quantity to an engine. Therefore mutual interference between the throttle control system and the fuel supply quantity control system in carrying out the traction control can be avoided, and fuel control can be carried out at a demanded minimum to thereby avoid a deterioration of exhaust gas characteristics.

According to a sixth feature of the present invention, said operating means comprises a driving wheel, and said first control means comprises a throttle valve opening control means, and said second control means comprises a brake controlling solenoid for controlling a braking pressure of a brake to be mounted to said driving wheel. Therefore, mutual interference between the throttle control system and the braking force control system in carrying out the traction control can be avoided, and a frequency of operation of the brake can be reduced to thereby suppress an increase in temperature of the brake.

According to a seventh feature of the present invention, the first computing means in the fifth or sixth feature is so constructed as to obtain said first operational quantity by adding an initial throttle opening defined according to a transmitting limit torque of said driving wheel preliminarily set according to a road surface condition during running of a vehicle, to an operational quantity obtained according to a signal having said frequency corresponding to said sensitivity of said first control means. Therefore, a feedforward quantity according to a road surface condition may be given to the throttle control system in the driving wheel traction control, thereby eliminating a large delay of control at a low response frequency.

It is another feature of the present invention to provide first and second physical quantity filters for filtering said physical quantity at frequencies individually corresponding to, said sensitivities of said first and second control means, respectively, and first and second target value filters for filtering said target value at said frequencies individually corresponding to said sensitivities of said first and second control means, respectively, wherein said first computing means is so constructed as to define said first operational quantity to be input to said first control means according to a deviation between a first physical quantity containing a first frequency component passed through said first physical quantity filter and a first target value containing said first frequency component passed through said first target value filter, and said second computing means is so constructed as to define said second operational quantity to be input to said second control means according to a deviation between a second physical quantity containing a second frequency component passed through said second physical quantity filter and a second target value containing said second frequency component passed through said second target value filter. Therefore mutual interference between both the control means can be avoided, and a sufficient control performance can be exhibited in both control means.

According to the constitution of the first feature, a signal for obtaining the operational quantities in the first and second feedback loops is divided into two signals containing the frequencies corresponding to the sensitivities of the first and second control means, respectively, by the first and second filter means provided in the first and second feedback loops. Then, the first and second operational quantities are defined by the first and second computing means according to the two signals separated above, respectively. Accordingly, the controls by the first and second control means are made orthogonal, with the result that mutual interference between the controls by both the control means can be prevented, and sufficient control performance can be exhibited. Furthermore, the controls in both the feedback loops are conducted according to the physical quantities having different extracted frequency components which are controllable by the first and second control means, respectively. Accordingly, sufficient control performance can be further exhibited.

According to the constitution of the second feature, the controls in both feedback loops are conducted according to the physical quantities having different extracted frequency components which are controllable by the first and second control means, respectively. Accordingly, a sufficient control performance can be exhibited.

According to the constitution of the third feature, the output physical quantity is separated by the first and second physical quantity filters to obtain first and second physical quantities containing different frequency components corresponding to the sensitivities of the first and second control means, respectively, while the target value is separated by the first and second target value filters to obtain first and second target values containing different frequency components corresponding to the sensitivities of the first and second control means, respectively. Then, the first and second operational quantities are defined by the first and second computing means according to the deviation between the first physical quantity and the first target value and according to the deviation between the second physical quantity and the second target value, respectively. Accordingly, even when the target value is variable in the control system, the controls by the first and second control means do not mutually interfere with each other, and sufficient control performance can be exhibited in both control means.

According to the constitution of the fourth feature, the deviation between the output physical quantity from the operating means and the target value is separated by the first and second deviation filters to obtain first and second deviations containing different frequency components corresponding to the sensitivities of the first and second control means, respectively. Then, the first and second operational quantities are defined by the first and second computing means according to the first and second deviations, respectively. Accordingly, even when the target value is variable in the control system, the controls by the first and second control means do not mutually interfere with each other, and sufficient control performance can be exhibited in both the control means.

According to the constitution of the fifth feature, in the case that the traction control of the driving wheel is carried out by the control of a throttle valve opening and the control of a fuel supply quantity, mutual interference between the throttle control system and the fuel supply quantity control system can be avoided, and fuel control can be carried out at a demanded minimum to thereby avoid deterioration of exhaust gas characteristics.

According to the constitution of the sixth feature, in the case that the traction control of the driving wheel is carried out by the control of a throttle valve opening and the control of a braking force of a driving wheel brake, mutual interference between the throttle control system and the braking force control system can be avoided, and the frequency of operation of the brake can be reduced to thereby suppress an increase in temperature of the brake.

According to the constitution of the seventh feature, a feedforward quantity according to a road surface condition is given to the throttle control system in the driving wheel traction control, thereby eliminating a large delay of control at a low response frequency.

According to another feature, the physical quantity is separated by the first and second physical quantity filters to obtain first and second physical quantities containing different frequency components corresponding to the sensitivities of the first and second control means, respectively, while the target value is separated by the first and second target value filters to obtain first and second target values containing different frequency components corresponding to the sensitivities of the first and second control means, respectively. Then, the first and second operational quantities are defined by the first and second computing means according to the deviation between the first physical quantity and the first target value and according to the deviation between the second physical quantity and the second target value, respectively. Accordingly, even when the target value is variable in the control system, the controls by the first and second control means do not mutually interfere with each other, and a sufficient control performance can be exhibited in both the control means.

BRIEF DESCRIPTION OF THE DRAWINGS

The advantages of the invention will become apparent in the following description taken in conjunction with the drawings, wherein.

DETAILED DESCRIPTION OF THE PREFERRED EMBODIMENTS

There will now be described some preferred embodiments of the present invention adapted to a traction control device for a vehicle with reference to tile drawings.

Figure 1:
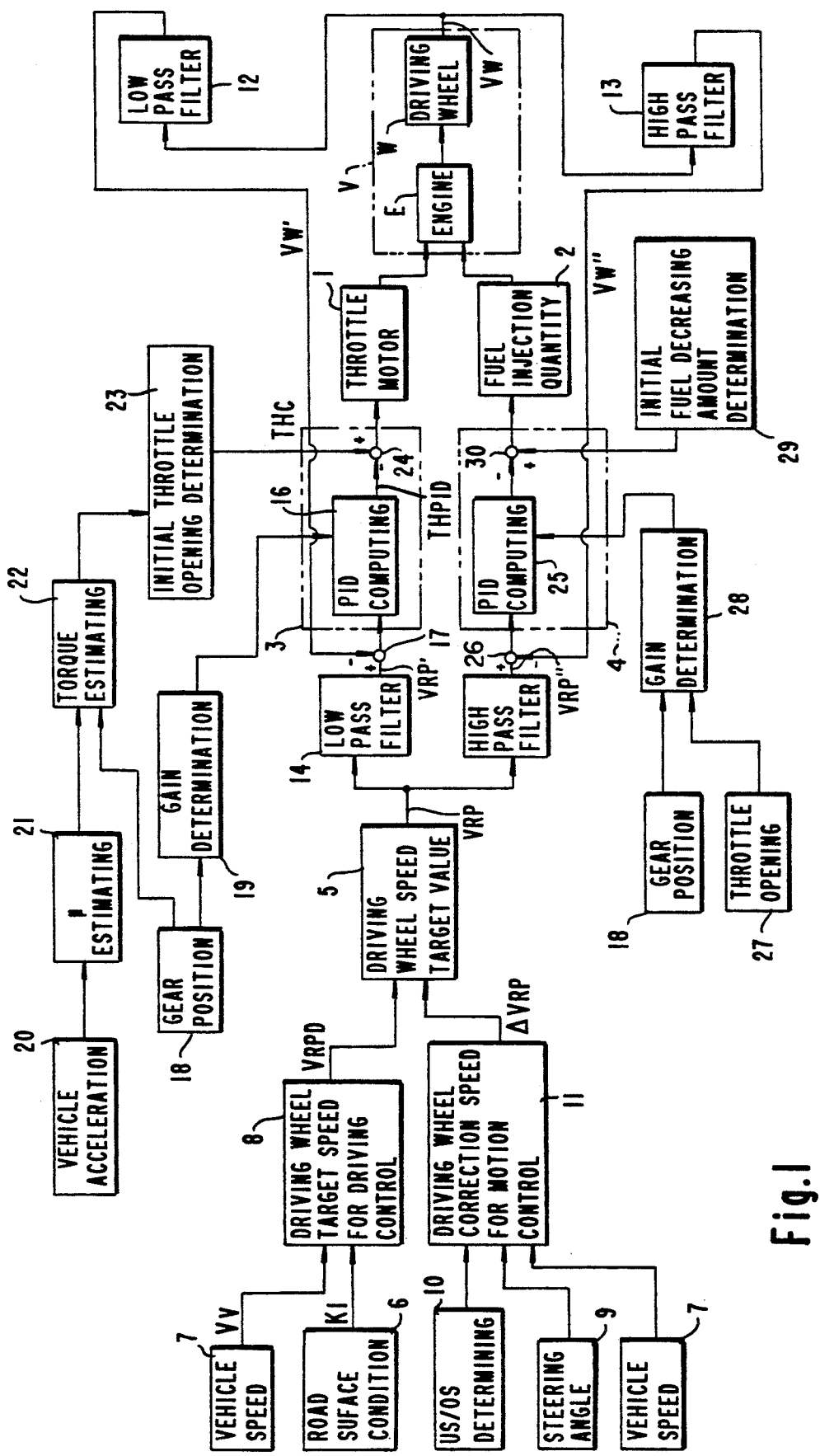
FIG. 1 is a block diagram of an embodiment of the present invention.

Referring first to FIG. 1 which shows an embodiment of the present invention, the traction control device is provided with a throttle motor (such as an electric motor for controlling the throttle valve position) as a first control means 1 for defining a throttle opening for an engine E mounted on a vehicle V and a fuel injection quantity control means as a second control means 2 for defining a fuel injection quantity to the engine E, so as to converge to a target value a speed $V_w$ of a driving wheel W as an output physical quantity of an operating means interlocked and connected with the engine E. An operational quantity of the throttle motor as a first operational quantity is input from a first computing means 3 to the first control means 1, while a fuel injection quantity as a second operational quantity is input from a second computing means 4 to the second control means 2. The first and second control means 1 and 2 have different control sensitivities in such a manner that a response frequency of the first control means 1 is low, and a response frequency of the second control means 2 is high. In other words, a time period from a change of the operational quantity to be input to the throttle motor as the first control means I to a change of a output torque of the driving wheel W is longer than a time period from a change of the operational quantity to be input to the fuel injection quantity control means as the second control means 2 to a change of the output torque of the driving wheel W. Furthermore, a frequency responsive to a fluctuation in the output torque of the driving wheel W when fluctuating the operational quantity at a certain frequency in the first control means 1 is lower than that in the second control means 2.

A target value VRP as a basis for setting the operational quantities in the first and second computing means 3 and 4 is defined by a driving wheel speed target value deciding means 5. The target value VRP is defined in consideration of a slip condition of the driving wheel W in its driving direction and a cornering motion condition (e.g. a yawing motion and/or a lateral acceleration) of the vehicle. A road surface condition determining section 6 selects a constant $K_1$, appropriately according to a road surface condition in such a manner that a large value of the constant $K_1$ is selected in case of a rough road, while a small value of the constant $K_1$ is selected in case of a smooth road. Further, a vehicle speed $V_v$ is detected by a vehicle speed detecting means 7. In accordance with the following equation (1), a target value $V_{RPD}$ of a driving wheel speed is obtained by a driving system driving wheel speed target value deciding means 8 according to a slip condition of the driving wheel W in its driving direction, so as to obtain a maximum driving force in a straight travelling direction of the vehicle V.

$$V_{RPD} = K_1 \times V_r \quad (1)$$

On the other hand, a target value correction quantity $\Delta V_{RP}$ of the driving wheel speed according to a cornering condition of the vehicle V is obtained by a steering system driving wheel speed target value correction quantity deciding means 11 on the basis of the vehicle speed obtained by the vehicle speed detecting means 7, a steering angle obtained by a steering angle detecting means 9, and a steering characteristic obtained by an understeer/oversteer determining section 10. If the target value of the driving wheel speed is decided only according to the slip condition of the driving wheel W in its driving direction, a side force applied to a tire will exceed a side force limit of the tire when the vehicle is steered as exceeding its side force limit under the control of obtaining a maximum driving force, with the result that a desired yaw motion cannot be obtained. Therefore, the target value obtained by the driving system driving wheel speed target value deciding means 8 is corrected by the correction quantity obtained by the steering system driving wheel speed target value correction quantity deciding means 11. Thus, the final target value VRP is obtained by the driving wheel speed target value deciding means 5. That is, the final target value VRP is obtained in accordance with the following equation (2).

$$VRP = V_{RPD} - \Delta V_{RP} \quad (2)$$

The driving wheel speed $V_w$ contains a slow speed change component corresponding to a change in the vehicle speed and a rapid speed change component corresponding to the generation of an excess slip condition. Therefore, the driving wheel speed $V_w$ is separated into a low-frequency component less than 2 Hz and a high-frequency component not less than 2 Hz by a first physical quantity filter 12 and a second physical quantity filter 13, respectively. The first physical quantity filter 12 allows the passing of the low-frequency component corresponding to the sensitivity of the first control means 1, while the second physical quantity filter 13 allows the passing of the high-frequency component corresponding to the sensitivity of the second control means 2. These physical quantity filters 12 and 13 are formed from a recursive type digital filter, which conducts filtering in accordance with the computation of the following equation (3).

$$Y(n) = a_1 Y(n-1) + a_2 Y(n-2) + a_3 Y(n-3) + \beta_0 X(n) + \beta_1 X(n-1) + \beta_2 X(n-2) + \beta_3 X(n-3) \quad (3)$$

where X represents an input signal to the filter; Y represents an output signal from the filter; $a_1$ to $a_3$ and $\beta_0$ to $\beta_3$ represent constants to be defined according to a test result; and the subscripts (n) to (n−3) represent a present value, previous value and so on of a certain cycle of repetition of the computation of the filtering.

The target value VRP obtained by the driving wheel speed target value deciding means 5 contains a target value change component corresponding to a speed change in the driving direction of the driving wheel obtained according to a road surface condition and a target value change component corresponding to a change in the road surface condition and a change in the cornering condition of the vehicle. Therefore, the target value VRP is separated into a low-frequency component less than 2 Hz and a high-frequency component not less than 2 Hz by a first target value filter 14 and a second target value filter 15, respectively. The first target value filter 14 allows the passing of the low-frequency component corresponding to the sensitivity of the first control means 1, while the second target value filter 15 allows the passing of the high-frequency component corresponding to the sensitivity of the second control means 2. These target value filters 14 and 15 also conduct filtering in accordance with the computation corresponding to the above-mentioned equation (3).

The first computing means 3 is so constructed as to define the first operational quantity according to a deviation between a driving wheel speed $V_w'$ containing the low-frequency component passing through the first physical quantity filter 12 and a target value $VRP'$ containing the low-frequency component passing through the first target value filter 14, while the second computing means 4 is so constructed as to define the second operational quantity according to a deviation between a driving wheel speed $V_w''$ containing the high-frequency component passing through the second physical quantity filter 13 and a target value $VRP''$ containing the high-frequency component passing through the second target value filter 15.

The first computing means 3 includes a PID computing circuit 16, and the deviation between the target value $VRP'$ and the driving wheel speed $V_w'$ obtained at a junction point 17 is input to the PID computing circuit 16. On the other hand, a gain in the computation by the PID computing circuit 16 is defined by a PID gain deciding circuit 19 according to a gear position of a transmission detected by a gear position detecting means 18. Further, coefficient of friction of a road surface is estimated by a road surface friction coefficient estimating means 21 according to a vehicle acceleration obtained by a vehicle acceleration detecting means 20, and driving wheel torque transmittable between the driving wheel W and the road surface is obtained from the estimated coefficient of friction according to a road surface condition (the coefficient of friction of the road surface) during the travelling of the vehicle V. Further, the engine output torque providing the same driving torque at each gear position is estimated from the detected gear position by an engine output torque estimating means 22. Further, a throttle opening corresponding to the estimated engine output torque is defined as an initial throttle opening $TH_c$ by an initial throttle opening deciding means 23. Then, the initial throttle opening $TH_c$ is added at a junction point 24 to an operational quantity $TH_{PID}$ obtained by the PID computing circuit 16.

In this manner, the PID operational quantity $TH_{PID}$ is computed according to the deviation between the target value $VRP'$ and the driving wheel speed $V_w'$, and a final operational quantity $\Theta_{TH}$ is defined by adding the initial throttle opening $TH_c$ to the operational quantity $TH_{PID}$ in accordance with the following equation (4) by the first computing means 3.

$$\Theta_{TH} = TH_c + TH_{PID} \quad (4)$$

The final operational quantity $\Theta_{TH}$ is input to the first control means 1. Then, the driving wheel output torque according to the road surface condition during travelling of the vehicle V is given as a feedforward quantity to the throttle opening control system, thereby eliminating a large delay of control at a low response frequency. Accordingly, the driving wheel output torque is controlled with the responsiveness less than 2 Hz which can sufficiently respond to the throttle opening control system.

The second computing means 4 includes a PID computing circuit 25, and the deviation between the target value VRP″ and the driving wheel speed $V_w$ obtained at a junction point 26 is input to the PID computing means 25. On the other hand, a gain in the computation by the PID computing circuit 25 is defined by a PID gain deciding circuit 28 according to the gear position of the transmission obtained by the gear position detecting means 18 and a throttle opening detected by a throttle opening detecting means 27. The reason why the PID control gain is made variable with the throttle opening is that an engine output torque fluctuating with an increase and decrease in a fuel quantity during control of the fuel quantity is varied with the throttle opening. Further, an initial fuel decrease quantity fixedly defined by an initial fuel decrease quantity deciding means 29 is added at a junction point 30 to an operational quantity obtained by the PID computing circuit 25. The initial fuel decrease quantity is defined in such a manner that when excess slip of the driving wheel W is detected, the fuel quantity is made lean to 80% of a normal fuel supply quantity, thereby reducing an engine output by 30%. Alternatively, fuel cut may be carried out before commencement of PID control in one of plural cylinders.

In this manner, the PID operational quantity is computed according to the deviation between the target value VRP″ and the driving wheel speed Vw and a final operational quantity is defined by adding the initial fuel decrease quantity to the operational quantity by the second computing means 4. Then, the final operational quantity is input to the second control means 2. Thus, the driving wheel output torque is controlled with the responsiveness of not less than 2 Hz which can sufficiently respond to the fuel quantity control system.

In operation, the final target value VRP is obtained in the driving wheel speed target value deciding means 5 by correcting the target value obtained in the driving system driving wheel speed target value deciding means 8 by the correction quantity obtained in the steering system driving wheel speed target value correction quantity deciding means 11. Then, the final target value VRP is filtered by the first target value filter 14 to pass a low-frequency component, and is also filtered by the second target value filter 15 to pass a high-frequency component. Then, the target value VRP′ containing the low-frequency component is input to the first computing means 3, and the target value VRP″ containing the high-frequency component is input to the second computing means 4. On the other hand, the driving wheel speed Vw as the physical quantity is filtered by the first physical quantity filter 12 to pass a low-frequency component, and is also filtered by the second physical quantity filter 14 to pass a high-frequency component. Then, the driving wheel speed Vw containing the low-frequency component is input to the first computing means 3, and the driving wheel speed Vw containing the high-frequency component is input to the second computing means 4.

Accordingly, the operational quantities to be computed by the first and second computing means 3 and 4 individually correspond to the sensitivities of the first and second control means 1 and 2, respectively. Accordingly, the controls of the first and second control means 1 and 2 do not mutually interfere with each other. Furthermore, since the controls of the first and second control means 1 and 2 are carried out simultaneously, the controls of both the control means 1 and 2 may be made sufficient.

Additionally, in a case where the traction control of the driving wheel is carried out by the control of an opening of the throttle valve and the control of a fuel supply quantity as mentioned above, fuel control may e carried out at demanded minimum to thereby avoid a deterioration of exhaust gas characteristics.

Figure 2:
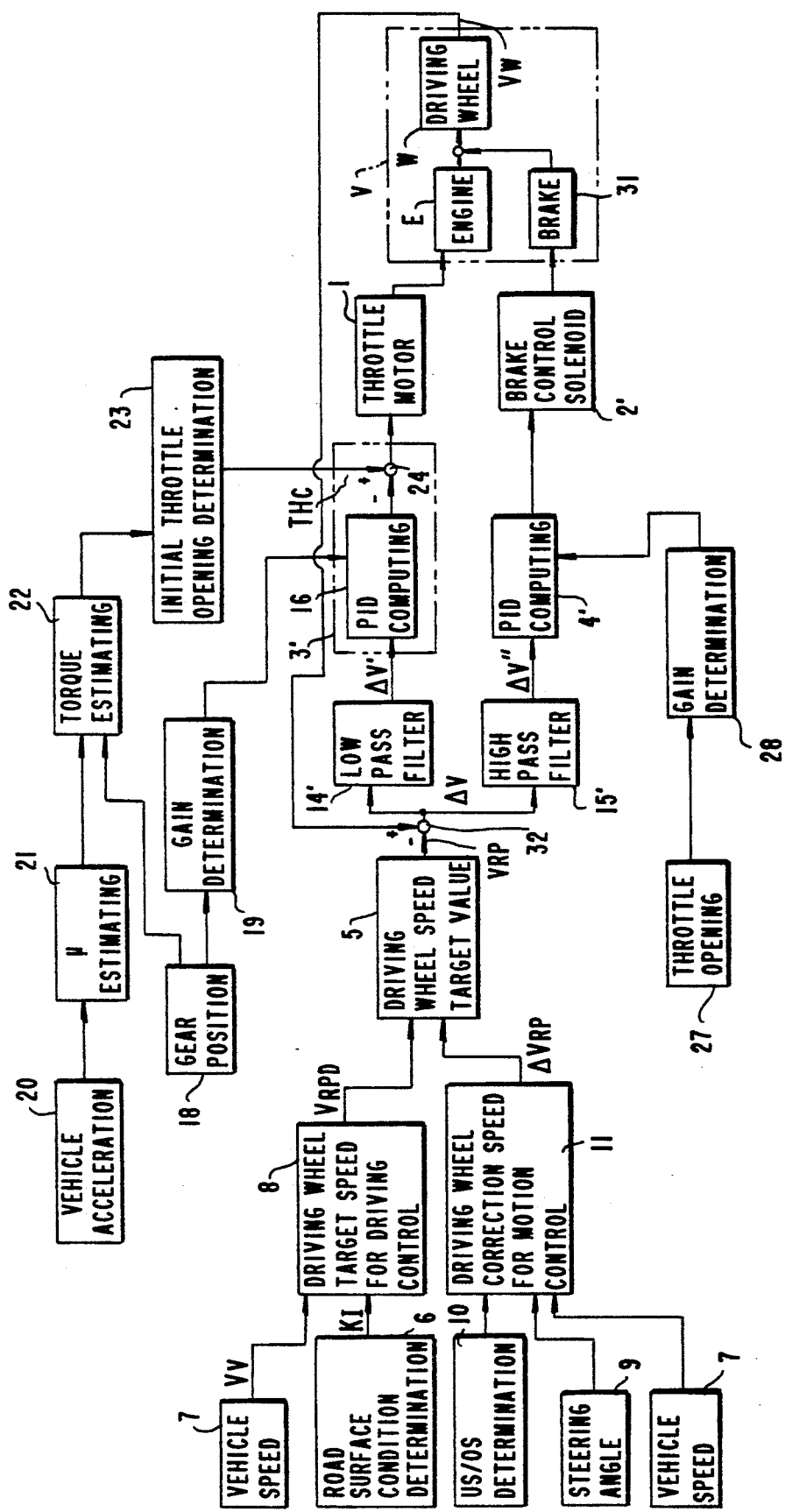
FIG. 2 is a block diagram of another embodiment of the present invention.

Referring next to FIG. 2 which shows a second preferred embodiment of the present invention, wherein the parts corresponding to those in the first preferred embodiment are designated by the same reference characters, the traction control device is provided with a throttle motor as a first control means 1 for defining a throttle opening for an engine E and a brake control solenoid as a second control means 2′ for controlling a braking force of a brake 31 mounted to a driving wheel W.

A deviation $\Delta V$ between a target value VRP obtained by a driving wheel speed target value deciding means 5 and a driving wheel speed $V_w$ as a physical quantity is obtained at a junction point 32. The deviation $\Delta V$ obtained above is input to a first deviation filter 14′ allowing the passing of a low-frequency component less than 2 Hz corresponding to a control sensitivity of the first control means 1, and is also input to a second deviation filter 15′ allowing the passing of a high-frequency component not less than 2 Hz corresponding to a control sensitivity of the second control means 2. Accordingly, a deviation signal $\Delta V'$ containing the low-frequency component less than 2 Hz is output from the first deviation filter 14′, while a deviation signal $\Delta V''$ containing the high-frequency component of not less than 2 Hz is output from the second deviation filter 15′.

The deviation signal $\Delta V'$, containing the low-frequency component only is input to a first computing means 3′. In the first computing means 3′, the deviation signal $\Delta V'$ is computed by a PID computing circuit 16, and an initial throttle opening $TH_c$ is added at a junction point 24 to an output from the PID computing circuit 16, thus obtaining a final operational quantity. Then, an engine output is controlled to be increased or decreased by the operation of the first control means 1 according to the final operational quantity.

On the other hand, the deviation signal $\Delta V''$ containing the high-frequency component only is input to a PID computing circuit as a second computing means 4′. Then, the second control means 2′ is operated according to an operational quantity obtained by the second computing means 4′, and the braking force of the brake 31 is controlled by the operation of the second control means 2′.

In this manner, a driving wheel torque is controlled by the throttle control system and the brake control system, with the result that the driving wheel speed $V_w$ is feedback-controlled to a target wheel speed. Particularly, as the deviation $\Delta V$ is separated into two frequency components at a certain frequency (2 Hz), the controls of both the control systems are made orthogonal to thereby prevent mutual interference.

Additionally, in the case that the traction control of the driving wheel is carried out by the control of an opening of the throttle valve and the control of a braking force of the driving wheel brake as mentioned above, the frequency of operation of the brake 31 may be reduced to thereby suppress an increase in temperature of the brake 31.

Although the cut-off frequency of the filters 12, 14, 14' in the feedback loop including the first control means 1 and the cut-off frequency of the filters 13, 15, 15' in the feedback loop including the second control means 2 or 2' are set to the same frequency (2 Hz) in the above preferred embodiments, the present invention is not limited to this case. For example, the filters 12, 14, 14' may be constructed of a low-pass filter allowing the passing of low frequencies less than 2.2 Hz, and the filters 13, 15, 15' may be constructed of a high-pass filter allowing the passing of high frequencies greater than 1.8 Hz. In modification, the filters 12, 14, 14' may be constructed of a low-pass filter allowing pass of low frequencies less than 1.8 Hz, and the filters 13, 15, 15' may be constructed of a high-pass filter allowing pass of high frequencies greater than 2.2 Hz. In a further modification, all the filters 12, 13, 14, 14', 15, 15' may be constructed of band-pass filters allowing the passing of response frequency bands of the corresponding control means.

The above preferred embodiments have been described in a case where the target value is fluctuated. However, in a case where the target value is constant, the frequency components are not naturally present in the target value, and the filters for separating the frequency of the target value are therefore unnecessary. In this case, as the frequency component of the deviation ΔV depends on the fluctuation in the physical quantity only in the second preferred embodiment, the second preferred embodiment can be applied to this case as it is. The first preferred embodiment can also be applied to this case by merely omitting the first and second target value filters 14 and 15. Further, in a case where the fluctuating frequency of the target value corresponds to the control sensitivity of only one (e.g., the first control means) of both the control means included in both the feedback loops, only the feedback loop including the first control means may be provided with a target value filter, and the remaining feedback loop including the other control means, that is, the second control means may not be provided with a target value filter.

The present invention may be applied to any other type of control. For example, the present invention may be applied to traction control by a control means for reducing a driving wheel torque such as an ignition timing control means and a power transmission control means between the engine and the driving wheel. Further, the present invention may be applied to simultaneous control by a fuel quantity control means, an ignition timing retard quantity control means and a throttle valve opening control means in conducting engine output control, especially, engine speed control (engine speed control according to an idling speed or an accelerator pedal opening). Further, the present invention may be applied to a control device for controlling a yaw motion of the vehicle as a physical quantity by an engine output control means (e.g., throttle valve opening control means), a brake control means and a steering angle control means.

Although specific embodiments of the instant invention have been described above and illustrated in the accompanying drawings in order to be more clearly understood, the above description is made by way of example and not as a limitation to the scope of the instant invention. It is contemplated that various modifications apparent to one of ordinary skill in the art could be made without departing from the scope of the invention which is to be determined by the following claims.

We claim:

1. A vehicle motion control device, comprising:
   an operating means for outputting a physical quantity which effects a vehicle motion;
   first and second control means having different sensitivities from one another and having outputs therefrom, said outputs of said first and second control means being input to said operating means in response to first and second operational quantities individually input to said first and second control means, respectively, wherein the output of said operating means is responsive to the input received from said first and second control means;
   first and second computing means coupled to said first and second control means for computing said first and second operational quantities in response to a filtered deviation between a predetermined target value and said output physical quantity, wherein said output physical quantity is feedback controlled to converge with said predetermined target value; and
   first and second filter means coupled to said computing means for passing frequencies individually corresponding to the sensitivities of said first and second control means, respectively, and for outputting said filtered deviation into said first and second computing means, said first filter means being provided in a feedback loop including said first control means and said first computing means, and said second filter means being provided in a second feedback loop including said second control means and said second computing means.

2. The vehicle motion control device of claim 1, wherein said first filter means includes a first physical quantity filter in said first feedback loop for filtering said output physical quantity from said operating means at a frequency corresponding to the sensitivity of said first control means, and wherein said second filter means includes a second physical quantity filter in said second feedback loop for filtering said output physical quantity at a frequency corresponding to the sensitivity of said second control means.

3. The vehicle motion control device of claim 1, wherein said first filter means includes,
   (a) a first target value filter in said first feedback loop for filtering said target value at a frequency corresponding to the sensitivity of said first control means, and
   (b) a first physical quantity filter in said first feedback loop for filtering said output physical quantity from said operating means at a frequency corresponding to the sensitivity of said first control means; and
   wherein said second filter means includes,
   (a) a second target value filter in said second feedback loop for filtering said target value at a frequency corresponding to the sensitivity of said second control means, and (b) a second physical quantity filter in said second feedback loop for filtering said output physical quantity at a frequency corresponding to the sensitivity of said second control means.

4. The vehicle motion device of claim 1, wherein said first filter includes a first deviation filter in said first feedback loop for filtering a deviation between a target value and said output physical quantity at a frequency corresponding to the sensitivity of said first control means, and wherein said second filter means includes a second deviation filter in said second feedback loop for filtering a deviation between the target value and said output physical quantity at a frequency corresponding to the sensitivity of said second control means.

5. The vehicle motion control device of any one of claims 1 to 4 wherein said operating means comprises a driving wheel of the vehicle, said first control means comprises a throttle valve opening control means and said second control means comprises a fuel quantity change control means for controlling a fuel supply quantity to an engine of the vehicle.

6. The vehicle motion control device of claim 5, wherein said first computing means includes means for obtaining said first operational quantity by adding an initial throttle opening defined according to a transmitting limit torque of said driving wheel preliminarily set according to a road surface condition during running of a vehicle, to an operational quantity obtained according to a signal having a frequency corresponding to the sensitivity of said first control means.

7. The vehicle motion control device of any one of claims 1 to 4, wherein said operating means comprises a driving wheel, and said first control means comprises a throttle value opening control means, and said second control means comprises a brake controlling solenoid for controlling a braking pressure of a brake to be mounted to said driving wheel.

8. The vehicle motion control device of claim 7, wherein said first computing means includes means for obtaining said first operational quantity by adding an initial throttle opening defined according to a transmitting limit torque of said driving wheel preliminarily set according to a road surface condition during running of a vehicle, to an operational quantity obtained according to a signal having a frequency corresponding to the sensitivity of said first control means.

9. A physical quantity control device, comprising:
first and second control means having different sensitivities from one another and having outputs therefrom, said outputs of said first and second control means being provided to change at least one physical quantity in response to first and second operational quantities individually input to said first and second control means;
first and second computing means coupled to said first and second control means for computing said first and second operational quantities in response to a filtered deviation between a predetermined target value and said physical quantity, wherein said physical quantity is feedback controlled to converge on said predetermined target value; and
first and second filter means coupled to said computing means, for passing frequencies individually corresponding to the sensitivities of said first and second control means, respectively, and for outputting said filtered deviation into said first and second computing means, said first filter means being provided in a feedback loop including said first control means and said first computing means, and said second filter means being provided in a second feedback loop including said second control means and said second computing means.

10. The physical quantity control device of claim 9, wherein said first filter means comprises a first physical filter in said first feedback loop for filtering said physical quantity at a frequency corresponding to the sensitivity of said first control means, and wherein said second filter means comprises a second physical quantity filter in said second feedback loop for filtering said physical quantity at a frequency corresponding to the sensitivity of said second control means.

11. The physical quantity control device of claim 9, wherein the sensitivity of said first control means corresponds to a fluctuating frequency of said target value, and said first filter means comprises a target value filter in said first feedback loop for filtering said target value at a frequency corresponding to the sensitivity of said first control means, and a first physical quantity filter in said first feedback loop for filtering said physical quantity at a frequency corresponding to the sensitivity of said first control means, and wherein said second filter means comprises a second physical quantity filter provided in said second feedback loop for filtering said physical quantity at a frequency corresponding to the sensitivity of said second control means.

12. A physical quantity control device, comprising:
first and second control means having different sensitivities from one another and having outputs therefrom, said outputs of said first and second control means being provided to change at least one physical quantity in response to first and second operational quantities individually input to said first and second control means;
first and second computing means coupled to said first and second control means for computing said first and second operational quantities in response to a filtered deviation between a predetermined target value and said physical quantity, wherein said physical quantity is feedback controlled to converge on said predetermined target value; and
first and second physical quantity filters coupled to said computing means for filtering said physical quantity at frequencies individually corresponding to the sensitivities of said first and second control means, respectively, and for outputting said filtered deviation into said first and second computing means and
first and second target value filters for filtering said target value at said frequencies individually corresponding to the sensitivities of said first and second control means, respectively,
wherein said first computing means is so constructed as to define said first operational quantity to be input to said first control means according to a deviation between a first physical quantity containing a first frequency component passed through said first physical quantity filter and a first target value containing said first frequency component passed through said first target value filter, and
wherein said second computing means is so constructed as to define said second operational quantity to be input to said second control means according to a deviation between a second physical quantity containing a second frequency component passed through said second physical quantity filter and a second target value containing said second frequency component passed through said second target value filter.

* * * * *